(12) United States Patent
Huber et al.

(10) Patent No.: US 6,590,668 B1
(45) Date of Patent: Jul. 8, 2003

(54) IMAGING OPTICAL SYSTEM FOR DIRECT PHASE-ANGLE MEASUREMENT OF RADIATION

(75) Inventors: Rainer Huber, Piding (DE); Junli Sun, Raubling-Nickelheim (DE); Bernd Leitner, Neubeuern (DE); Hans Steinbichler, Neubeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 09/456,962

(22) Filed: Dec. 7, 1999

(30) Foreign Application Priority Data

Dec. 7, 1998 (DE) .......................... 198 56 400

(51) Int. Cl.[7] .................................. G01B 9/02
(52) U.S. Cl. ........................................ 356/520
(58) Field of Search ............... 356/35.5, 457, 356/458, 520

(56) References Cited

U.S. PATENT DOCUMENTS 4,139,302 A * 2/1979 Hung et al. ............... 356/520
4,676,642 A * 6/1987 French ...................... 356/520
4,682,892 A * 7/1987 Chawla ..................... 356/35.5
4,722,604 A * 2/1988 French et al. .............. 356/520
4,887,899 A * 12/1989 Hung ....................... 356/35.5

FOREIGN PATENT DOCUMENTS

| DE | 19513233 | 10/1996 |
| EP | 0419936 | 4/1991 |

* cited by examiner

Primary Examiner—Samuel A. Turner
(74) Attorney, Agent, or Firm—Dilworth & Barrese LLP

(57) ABSTRACT

A method serves the direct phase-angle measurement of radiation, in particular of light radiation which is reflected from a body. The body is exposed to coherent radiation. The radiation reflected from the body is imaged by an imaging optical system (6) in an image plane in which a sensor is located. A reference radiation generated in accordance with the shearing method is superimposed on the sensor. The phase of the radiation from the body is determined from the measurement signals of the sensor. To improve such a method, the imaging optical system (6) possesses a diaphragm (11) having one or two apertures (12, 13) (FIG. 2a).

27 Claims, 4 Drawing Sheets

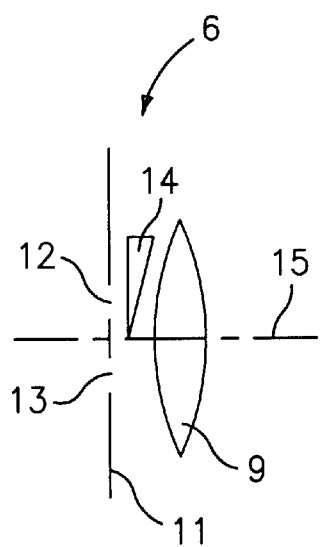
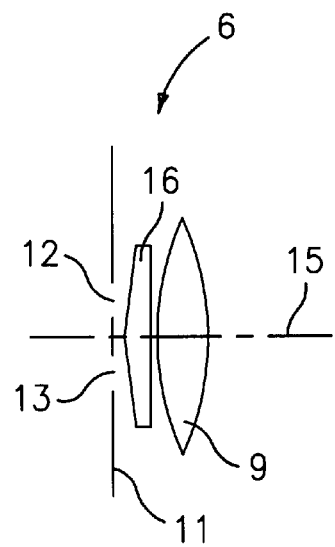
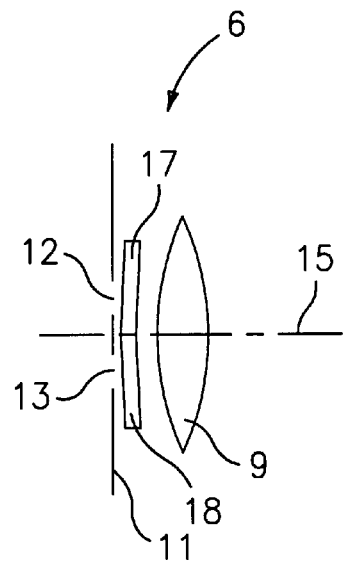
*FIG. 2a*  *FIG. 2b*  *FIG. 2c*
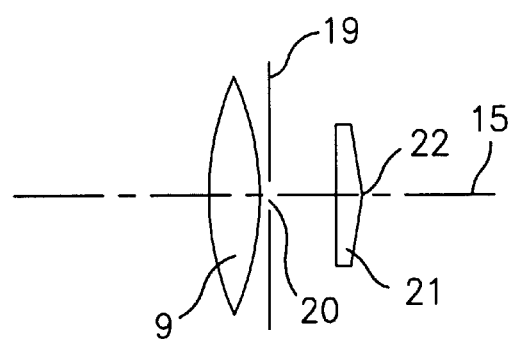
*FIG. 3*

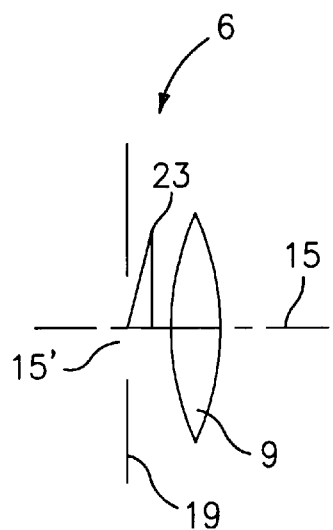 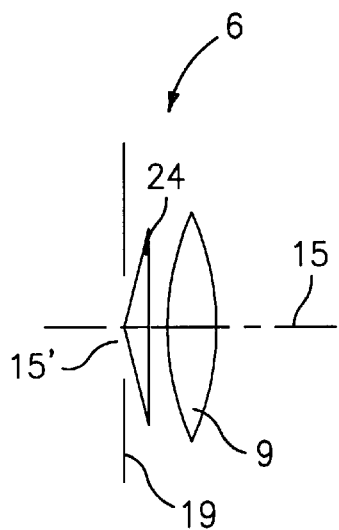 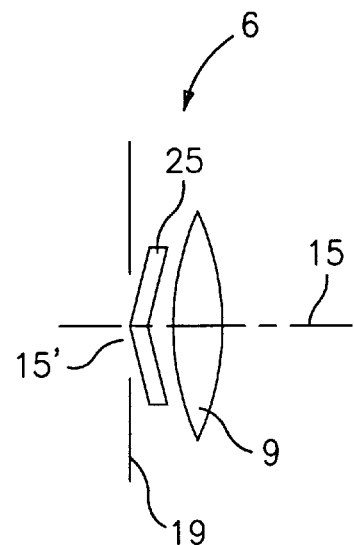
*FIG. 5a*        *FIG. 5b*        *FIG. 5c*
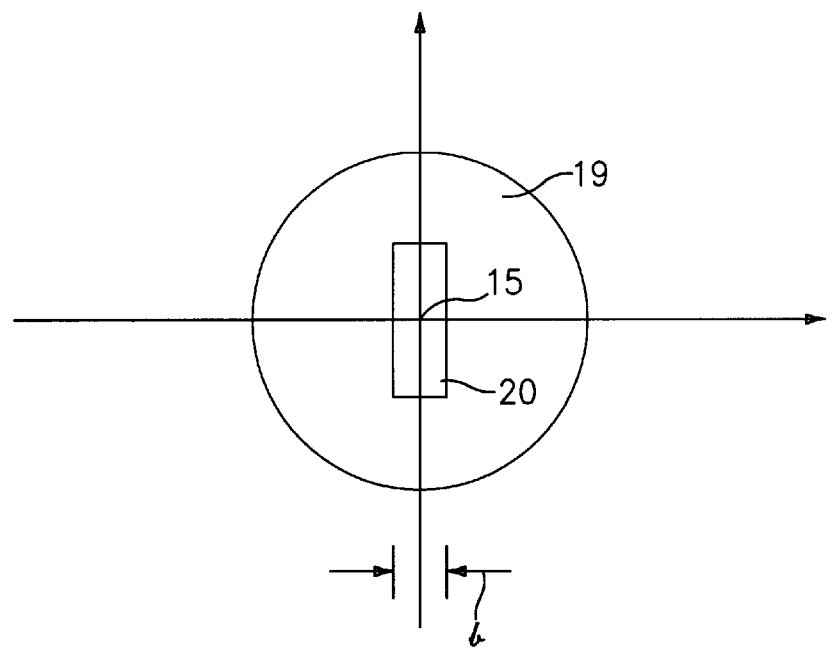
*FIG. 6*

IMAGING OPTICAL SYSTEM FOR DIRECT PHASE-ANGLE MEASUREMENT OF RADIATION

BACKGROUND OF THE INVENTION

The invention relates to a method for the direct phase-angle measurement of radiation in accordance with light radiation reflected by a body (3) or passing through a transparent body, in which the body (3) is exposed to coherent radiation (2) of pre-determined frequency or the body (3) is coated with a lacquer in which particle diffusely reflecting the radiation are stored and which is exposed to non-coherent radiation (2) of a pre-determined frequency, the radiation reflected by the body (3) or the radiation which has passed through the body being imaged by an imaging optical system (6) in an image plane (7) in which a sensor (8) is located, a reference radiation generated in accordance with a shearing method being superimposed on the sensor (8), and the phase of the radiation (5) from the body (3) being determined from the measurement signals of the sensor (8). It further relates to an apparatus for the performance of such a method.

A method for the direct phase-angle measurement of radiation, in particular of light radiation, and an apparatus for the direct phase-angle measurement of radiation, in particular of light radiation, are known from EP 0 419 936 B1. In the prior known methods, a body is exposed to coherent radiation of a pre-determined frequency. The body can possess a diffuisely reflecting surface. However, it is also possible for it to be a transparent or partially transparent body or a transparent medium through which the radiation passes. Furthermore, the body can have or be provided with a lacquer coating in which particles diffusely reflecting the radiation are incorporated; in this case, a non-coherent radiation of a pre-determined frequency is sufficient to perform the method. The radiation reflected from the body or the radiation which has passed through the body or the transparent medium is imaged by an imaging optical system in an image plane in which a sensor is located. The sensor in question is preferably a surface sensor. It preferably possesses a plurality of picture elements which are preferably in a regular order. Preferably, the picture elements are ordered by lines along parallel lines and possess the same distance to each other. A CCD sensor is particularly suitable.

In an embodiment of EP 0 419 936 B1, a reference radiation generated according to the shearing method is superimposed on the sensor. This reference radiation is generated by a shearing optical system, for example an optical wedge or prism. The optical wedge or the prism is positioned prior to the lens in an embodiment of EP 0 419 936 B1. The optical wedge or the prism masks a part, preferably one half, of the lens or the aperture of the imaging optical system. The phase of the radiation from the body, that is the phase of the radiation which was reflected by or which passed through the body, is determined from the measurement signals or the intensity signals of the sensor or sensor elements (pixels).

The apparatus known from EP 0 419 936 B1 can also be called an electronic speckle pattern interferometer (ESPI). To allow a complete phase-angle measurement with one single shot, in EP 0 419 936 B1 the imaging optical system is designed or adjusted in such a way that the image of a speckle generated by the radiation on the body in the image plane covers at least three sensor elements.

From DE 195 13 233, a method and an apparatus are known for the determination of phases and phase differences of radiation, in particular of light radiation. In this method, an object is exposed in at least two states to coherent or partially coherent radiation of a pre-determined frequency. In each state, the radiation reflected or passed through is imaged by an imaging optical system in an image plane in which a sensor with a plurality of preferably regularly ordered sensor elements or pixels is located. A reference radiation having a defined, preferably identical frequency with a defined phase position is superimposed on the sensor. The phase difference of the radiation from or through the object between the two states is determined from the intensity signals of the sensor elements or pixels. The object beam and the reference beam are adjusted in such a way here that they generate an interference pattern with a preferably constant spatial carrier frequency. The method and apparatus in accordance with DE 195 13 233 A1 have the object of further developing the method and the apparatus known from EP 0 419 936 B1 in such a way that with one image shot per object state a high image resolution is achieved. In accordance with DE 195 13 233 A1, this object is to be solved by the imaging optical system being designed and adjusted in such a way that when speckles occur, the image of a speckle in the image plane generated by the radiation only covers around two sensor elements or pixels. The corresponding intensity values recorded for each state from in each case only around two sensor elements or pixels are taken into account alternately or cross-ways for the determination of the phase difference. In addition to the phase difference, it is also possible to compute from at least two of these shots the phase, the contrast and the background brightness. In accordance with DE 195 13 233 A1, it is possible to generate the reference radiation from the object radiation in accordance with the shearing method. Although the performance of the method in accordance with DE 195 13 233 A1 is generally possible, the results that can be achieved with it have, however, substantially more noise. The signal/noise ratio is worse than with the method in accordance with EP 0 419 936 B1.

SUMMARY OF THE INVENTION

It is the object of the invention to improve a method and an apparatus of the type first given.

This object is solved in accordance with the invention by the imaging optical system possessing a diaphragm having an aperture, preferably a slit, or a diaphragm having two apertures, preferably two slits. By means of the aperture(s) of the diaphragm and the shearing optical system, it is possible to generate a spatial carrier frequency.

Advantageous aspects are described hereinbelow.

The diaphragm can possess a slit, preferably a rectangular slit. It is advantageous if the breadth of the slit can be adjusted. It is preferably a rectangular modulation diaphragm.

The diaphragm can, however, also be designed as a double slit. It then possesses preferably two rectangular slits. Preferably, the slits, which are disposed at a distance a to each other, each possess the same breadth b. It is furthermore advantageous if the distance a and/or the width b of the slits is/are able to be adjusted.

The shearing optical system which serves to generate the reference radiation in accordance with the shearing method, can possess a wedge or folding wedges or two tilted parallel plates. However, other optical elements are also possible to generate the shearing effect.

The wedge or folding wedges or the tilted parallel plates or the other optical element for the generation of the shearing effect can be disposed between the diaphragm and one or more or all lens elements or other optical elements of the imaging optical system. Instead of this or additionally, the diaphragm can be disposed between one or more or all lens elements or other optical elements of the imaging optical system and the wedge or folding wedges or the tilted parallel plates or the other optical element for the generation of a shearing effect.

A particularly advantageous aspect is characterised by the imaging optical elements being or having been adjusted in such a way that the distance a of the slit is of the same size as the breadth b of the slit. This advantageous aspect cannot only be used in embodiments having two slits ("double-aperture), but also in embodiments where only one slit is present. In the latter case, namely, it is achieved by the imaging optical system that the sensor "sees" two slits.

A spatial carrier frequency which is generated by the interference of a double slit or a double-aperture diaphragm (see FIG. 2) or a Fresnel biprism (see FIG. 3) does not possess a constant period and has a poor contrast as the interference and diffraction effects always occur simultaneously and interfere with each other. The interference distribution of a double slit with Fraunhofer diffraction is described in the equations (1) to (3) given below:

$$I(\theta) = 4 I_0 [(\sin^2\beta/(\beta^2)] \cos^2 \alpha \quad \quad 1)$$

$$\alpha = (ka/2) \sin \theta \quad \quad 2)$$

$$\beta = (kb/2) \sin \theta \quad \quad 3)$$

The object covered by these equations and the values occurring in them are shown in FIG. 4. In the equations:

I=intensity
θ=angle
k=ordinal number of the first, second, third, . . . interference minimum
a=slit distance
b=slit breadth.

In accordance with the mentioned advantageous further aspect a=b.

It follows from this that:

α=β so that equation (1) becomes the following equation (1'):

$$I(\theta) = 4 I_0 [(\sin^2(2\alpha))/(2\alpha)^2] \quad \quad 1')$$

It can be seen from this that the carrier frequency generated by interference and diffraction and not constant at a≠b becomes through a=b a homogeneously distributed spatial frequency with a constant period. It can be seen from the term 2α that the frequency is doubled by this. Through a=b a substantial improvement can be achieved which is to be found in the fact that a constant carrier frequency with a much better contrast can be generated at the sensor or CCD chip. This carrier frequency can be generated in the lines (horizontal) or in the columns (vertical) of the sensor or CCD chip. However, it is also possible to generate them in an intermediate angle, which can be achieved by disposing the sensor or CCD chip tilted at an angle.

Another advantageous further aspect is characterised in that the period of the carrier frequency covers at least two picture elements of the sensor. It is therefore possible to work in accordance with the methods of DE 195 13 233 A1 or with the apparatuses described there.

It is advantageous if the period of the carrier frequency covers at least three picture elements of the sensor, that is if work is done in accordance with the methods of EP 0 419 936 B1 or with the apparatuses described there. In accordance therewith, a complete phase-angle measurement is possible with one single shot.

In accordance with another advantageous aspect, the period of the carrier frequency covers at least four picture elements of the sensor. In this way, the computation algorithms are made substantially simpler.

If the period of the carrier frequency covers at least five picture elements of the sensor, a further increase in precision is achieved.

The period of the carrier frequency in one line or column can be adjusted very precisely by the aperture size of the modulation diaphragm independently of the shearing optical system or the shear width. The shearing optical system or the shear width are adjusted so that the preferred minimum number of the picture elements of the sensor is covered.

BRIEF DESCRIPTION OF THE DRAWINGS

Embodiments of the invention are described below in detail by means of the attached drawing in which

FIG. 2 shows different shearing optical systems having a double slit;

FIG. 3 shows an imaging optical system having a single slit and a Fresnel briprism;

FIG. 5 shows different shearing optical systems having a single slit; and

FIG. 6 shows a modulation diaphragm in a front view.

DESCRIPTION OF THE PREFERRED EMBODIMENTS

Figure 1:
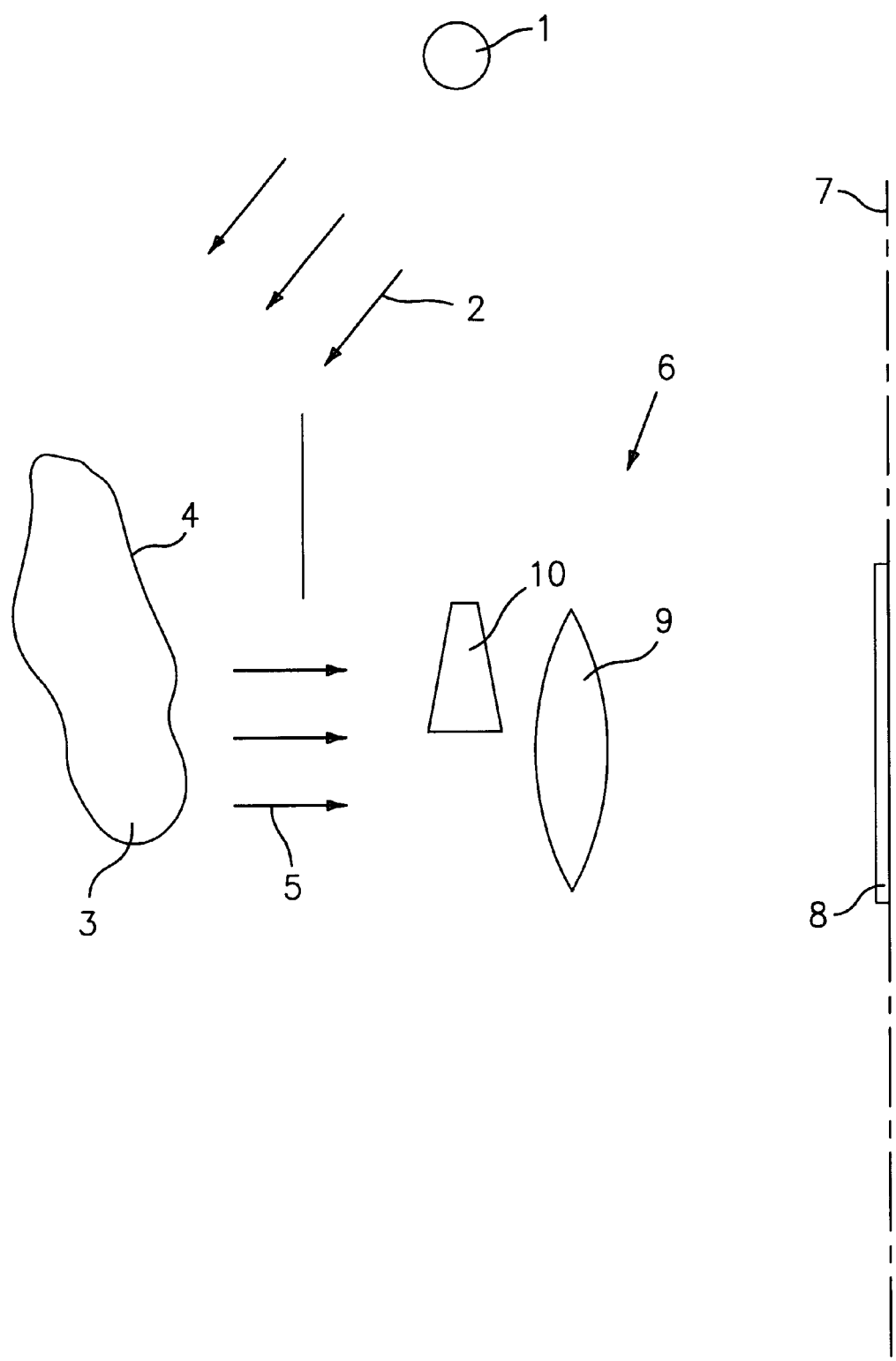
FIG. 1 shows an apparatus for the direct phase-angle measurement of radiation with a shearing optical system.

The apparatus shown schematically in FIG. 1 for the direct phase-angle measurement of light radiation comprises a radiation source I from which coherent radiation (laser radiation) 2 of a pre-determined frequency is radiated onto the body 3 having a diffuisely reflecting surface 4.

The radiation 5 reflected from the surface 4 of the body 3 is imaged by an imaging optical system 6 in an image plane 7 in which a sensor 8 is disposed with a plurality of regularly disposed sensor elements, for example a CCD sensor.

An optical wedge 10 or a prism is disposed in front of the lens element 9 of the imaging optical system 6 which covers the upper half of the imaging optical system 6. By means of the optical wedge 10, a reference radiation is generated in accordance with the shearing method. Instead of the optical wedge 10, other optical elements may also be used to generate a shearing effect.

The basic design of the apparatus of FIG. 1 and the method generally performable therewith are known from EP 0 419 936 B1. A device not shown in the drawing is connected to the sensor 8 through which device the phase of the radiation 5 reflected from the body 3 or its surface 4 is determined from the measurement signals or intensity signals of the sensor 8.

In accordance with the invention, the imaging optical system possesses a diaphragm in which there are one or two apertures or slits. Examples for such imaging optical systems are shown in FIGS. 2, 3 and 5. The imaging optical systems shown there replace the imaging optical system 6 shown in the apparatus of FIG. 1.

Figure 4:
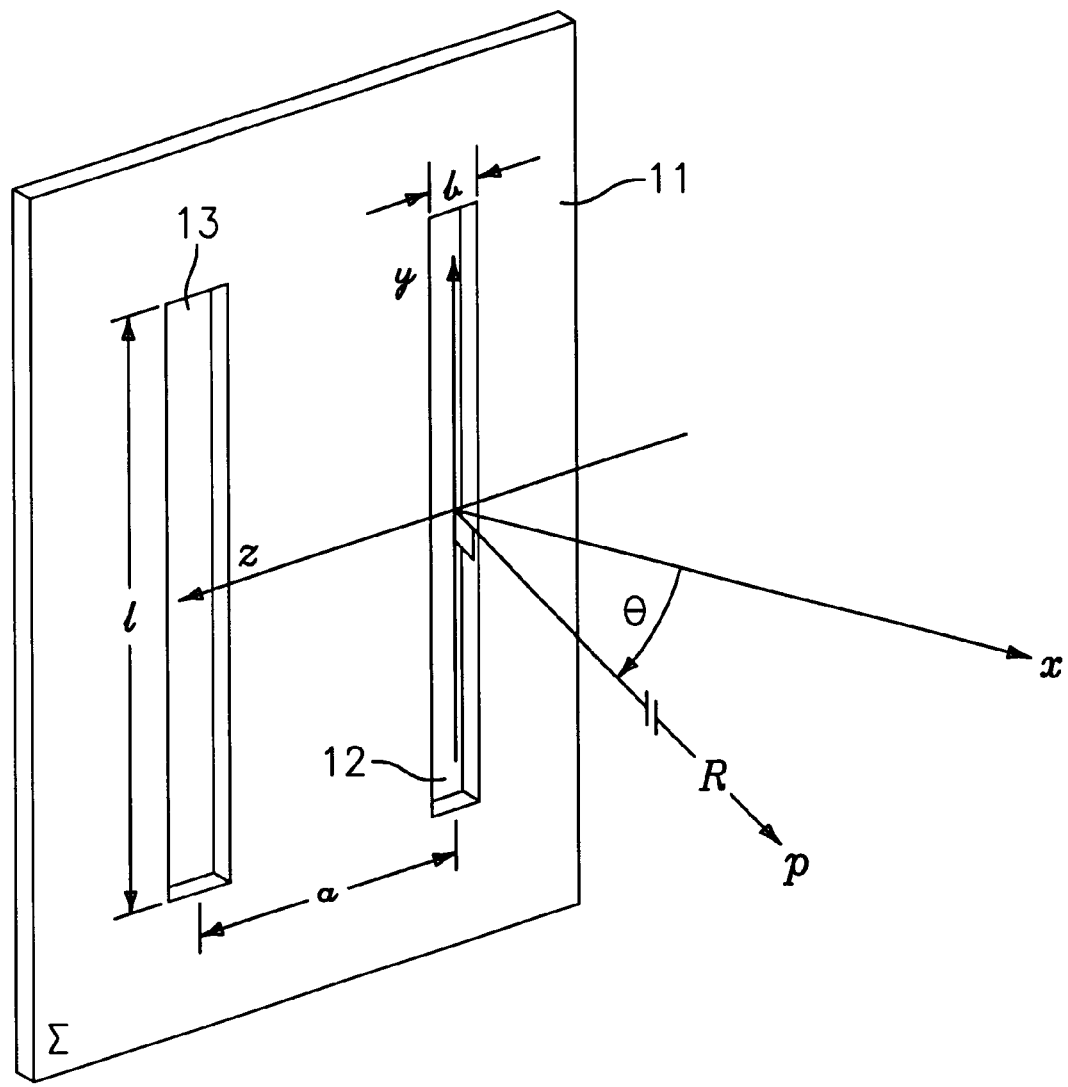
FIG. 4 shows a diaphragm having a double slit.

In FIG. 2, embodiments are shown having diaphragms which possess two apertures, preferably two slits, each. One embodiment example of such a double slit diaphragm 11 is shown in a perspective view in FIG. 4. This double slit diaphragm 11 possesses a first rectangular slit 12 having a length l and a breadth b as well as a second, also rectangular slit 13 having the same height l and the same breadth b which is disposed at a distance a from the first slit 12 and which is parallel to the first slit 12.

In the embodiment of FIG. 2a, the imaging optical system 6 possesses a wedge 14 which is located between the double slit diaphragm 11 and the lens element 9 of the imaging optical system 6. The wedge 14 is disposed in the region of the first slit 12. The light passing through the first slit 12 passes through the wedge 14 and subsequently through the lens element 9. The light passing through the second slit 13 does not pass through the wedge, but directly into the lens 9. The tip of the wedge 14 is in the region between the slits 12 and 13, preferably on the centre axis 15 of the imaging optical system 6. It is expanded in the manner visible from FIG. 2a in an outward direction, that is in the direction of an increasing distance from the longitudinal centre axis 15 of the imaging optical system 6.

In the embodiment of FIG. 2b, a biprism 16 is disposed between the double slit diaphragm 11 and the lens element 9 of the imaging optical system 6. The tip of the biprism 16 is located in the region between the slits 12 and 13. It is preferably on the longitudinal centre axis 15 or the longitudinal centre plane 15 of the imaging optical system 6. The thickness of the biprism reduces in the outward direction, that is in the direction away from the longitudinal centre axis or longitudinal centre plane 15.

In the embodiment shown in FIG. 2c, two tilted parallel plates 17, 18 are disposed between the double slit diaphragm 11 and the lens element 9 of the imaging optical system 6. The incident faces and exit faces of the parallel plates 17 and 18 are parallel to each other so that the beams passing through are only shifted in parallel. The first parallel plate 17 is in the region of the first slit 12, the second parallel plate 18 is in the region of the second slit 13. The parallel plates 17 and 18 are tilted relative to the longitudinal centre axis or longitudinal centre plane 15 of the imaging optical system 6 in such a way that the distance of the relevant parallel plate increases from the double slit diaphragm 11 outwardly, that is in the direction of increasing distance from the longitudinal centre axis or longitudinal centre plane 15.

The imaging optical system 6 shown in FIG. 3 possesses a diaphragm 19 having an aperture or a slit or a single slit 20 as well as a Fresnel biprism 21. The single slit diaphragm 19 is located between the lens element 9 of the imaging optical system 6 and the Fresnel biprism 21. The arrangement is disposed in such a way that the longitudinal centre axis or longitudinal centre plane 15 of the imaging optical system 6 passes through the centre of the aperture or of the single slit 20 and through the tip 22 of the Fresnel biprism. The incident face of the Fresnel biprism 21 is plane. It is perpendicular to the longitudinal centre axis 15. The exit faces of the Fresnel biprism 21 are tilted relative to the longitudinal centre axis or longitudinal centre plane 15 in such a way that the distance between the double slit diaphragm 19 and the relevant exit face of the Fresnel biprism 21 decreases with increasing distance from the longitudinal centre axis or longitudinal centre plane 15.

An embodiment for a single slit diaphragm is shown in FIG. 6. The diaphragm 19 possesses a rectangular slit 20 whose breadth b can be changed (not shown in FIG. 6).

FIG. 5 shows different embodiments of imaging optical systems which each possess a single slit diaphragm 19 having a slit 15' and a lens element 9 between which an optical element for the generation of a shearing effect is disposed.

In the embodiment of FIG. 5a, an optical wedge 23 is disposed between the double slit diaphragm 19 and the lens element 9, which optical wedge is turned through 180° relative to the disposition of the optical wedge 14 in FIG. 2a and which extends to the longitudinal centre axis 15. The thickness of the optical wedge 23 decreases with increasing distance from the longitudinal centre axis 15.

In the embodiment of FIG. 5b, a biprism 24 is disposed between the single slit diaphragm 19 and the lens element 9 in a way corresponding to that of FIG. 2b so that reference can be made to the description there.

In the embodiment shown in FIG. 5c, two tilted parallel plates 25 and 26 are disposed between the single slit diaphragm 19 and the lens element 9 in a way corresponding to the embodiment of FIG. 2c so that reference can be made to the statements there.

It is advantageous to adjust the imaging optical system in such a way in each case that in the equations (2) and (3) a=b applies so that equation (1) becomes equation (1'). In this case, diffraction and interference are congruent. Diffraction and interference amplify one another which leads to a better image quality. Thanks to the optical elements shown in FIG. 5, it is achieved that the sensor "sees" two slits instead of the physically existing single slit.

The method in accordance with the invention and the apparatus in accordance with the invention can be used to measure tension values and strain values. They are in particular suitable for non-destructive inspection or non-destructive material inspection, in particular of compound materials and in particular of tyres.

What is claimed is:

1. A method for a direct phase-angle measurement of radiation (2) passing through a body (3), comprising the steps of exposing the body (3) to coherent radiation (2) of predetermined frequency, imaging radiation passing through the body (3) by an imaging optical system (6) in an image plane (7) in which a sensor (8) is located and possessing a diaphragm (11, 19) having at least one aperture (20), positioning one of a wedge (14, 23), or folding wedges (16, 24) or two tilted parallel plates (17, 18, 25, 26) adjacent the diaphragm (11, 19), positioning at least one lens element (9, 19) on a side of the wedge (14, 23), or folding wedges (16, 24) or tilted plates (17, 18, 25, 26) opposite said diaphragm (11, 19) or on a side of said diaphragm (11, 19) opposite the wedge (14, 23), or folding wedges (16, 24) or tilted parallel plates (17, 18, 25, 26), superimposing a reference radiation which has been generated in accordance with a shearing method upon the sensor (8), and determining phase of the radiation (5) from the body (3) by measurement signals of the sensor (8).

2. The method of claim 1, comprising the additional step of providing the diaphragm (19) with a single slit (20).

3. The method of claim 1, comprising the additional step of providing the diaphragm (11) with two slits (12, 13).

4. The method of claim 2 comprising the additional step of adjusting breadth of the single slit (20) which is substantially rectangular.

5. The method of claim 3, comprising the additional step of providing the diaphragm (11) with two substantially rectangular slits (12, 13).

6. The method in accordance with claim 5, comprising the additional step of
adjusting at least one of distance (a) between said two slits (12, 13) and breadth (b) of each said slit (12, 13).

7. A method in accordance with claim 6, comprising the additional step of adjusting the imaging optical system (6) such that distance (a) between center lines of adjacent slits (12, 13) and breadth (b) of each said slit (12, 13) are equal.

8. The method in accordance with claim 1, comprising the additional step of providing a period of carrier frequency to cover multiple picture elements of the sensor (8).

9. The method in accordance with claim 1, comprising the step of generating a constant spatial carrier frequency.

10. A method for a direct phase-angle measurement of radiation (2) reflected by a body (3), comprising the steps of
coating the body (3) with lacquer in which particles diffusely reflecting the radiation are stored and then exposing the thus-coated body (3) to non-coherent radiation (2) of a pre-determined frequency,
imaging radiation reflected by the body (3) by an imaging optical system (6) in an image plane (7) in which a sensor (8) is located and possessing a diaphragm (19) having at least one aperture (20),
positioning one of a wedge (14, 23), or folding wedges (16, 24) or two tilted parallel plates (17, 18, 25, 26) adjacent the diaphragm (11, 19),
positioning at least one lens element (9, 19) on a side of the wedge (14, 23), or folding wedges (16, 24) or tilted plates (17, 18, 25, 26) opposite said diaphragm (11, 19) or on a side of said diaphragm (11, 19) opposite the wedge (14, 23), or folding wedges (16, 24) or tilted parallel plates (17, 18, 25, 26),
superimposing a reference radiation which has been generated in accordance with a shearing method upon the sensor (8), and
determining phase of the radiation (5) from the body (3) by measurement signals of the sensor (8).

11. The method of claim 10, comprising the additional step of providing the diaphragm (19) with a single slit (20).

12. The method of claim 10, comprising the additional step of providing the diaphragm (11) with two slits (12, 13).

13. The method of claim 11, comprising the additional step of adjusting breadth of the single slit (20) which is substantially rectangular.

14. The method of claim 12, comprising the additional step of providing the diaphragm (11) with two substantially rectangular slits (12, 13).

15. The method in accordance with claim 14, comprising the additional step of adjusting at least one of distance (a) between said two slits (12, 13) and breadth (b) of each said slit (12, 13).

16. A method in accordance with claim 15, comprising the additional step of adjusting the imaging optical system (6) such that distance (a) between center lines of adjacent slits (12, 13) and breadth (b) of each said slit (12, 13) are equal.

17. The method in accordance with claim 10, comprising the additional step of providing a period of carrier frequency to cover multiple picture elements of the sensor (8).

18. The method in accordance with claim 10, comprising the step of generating a constant spatial carrier frequency.

19. Apparatus for direct phase-angle measurement of radiation reflected from a body (3) or passing therethrough (3), comprising
a radiation source for emission of radiation (2) of certain frequency onto the body (3),
an imaging optical system (6) arranged for imaging radiation (5) reflected from the body (3) or passing therethrough (3), in an image plane (7) and possessing a diaphragm (11, 19) having at least one aperture (20),
a sensor (8) disposed in the image plane (7),
a wedge (14, 23), or folding wedges (16, 24) or two tilted parallel plates (17, 18, 25, 26) positioned adjacent to said diaphragm (11, 19) in said optical system (6),
at least one lens element (9, 19) positioned on a side of the wedge, or folding wedges (16, 24) or tilted parallel plates (17, 18, 25, 26) opposite from the diaphragm (11, 19) or on a side of the diaphragm (11, 19) opposite the wedge (14, 23), or folding wedges (16, 24) or tilted parallel plates (17, 18, 25, 26) and
a shearing optical system for generating a reference radiation in accordance with a shearing method.

20. An apparatus in accordance with claim 19, wherein the diaphragm (19) possesses a single substantially rectangular slit (20) having a breadth (b) which can be adjusted.

21. An apparatus in accordance with claim 19, wherein the diaphragm (11) possesses two substantially rectangular slits (12, 13).

22. An apparatus in accordance with claim 21, wherein distance (a) between the slits (12, 13) and breadth (b) of each said slit (12, 13) is adjustable.

23. An apparatus in accordance with claim 22, wherein the image optical system (6) is adjusted such that distance between center lines of adjacent rectangular slits (12, 13) equals breadth (b) of each said slit (12, 13).

24. An apparatus in accordance with claim 19, structured and arranged such that a period of a carrier frequency covers multiple picture elements of the sensor (8).

25. The apparatus in accordance with claim 21, wherein said diaphragm (11) comprises said rectangular slits (12, 13) laterally arranged adjacent to one another and comprising one of a
wedge (14) having an apex resting on a center line (15) situated between said two slits (12, 13),
a bi-prism (16) having an apex situated on a center line (15) between said two slits (12, 13), or
two tilted plates tilted (17, 18) outwardly from said diaphragm (11), being centered around a center line (15) situated between said two slits (12, 13) and having parallel incident and exit surfaces.

26. An apparatus in accordance with claim 20, wherein said diaphragm (19) comprises a single slit (20) and one of a
wedge (23) having a thickest base portion situated upon a center line of the slit (20);
a bi-prism (24) situated to have an apex upon a center line of the slit (15), or
two tilted plates (25, 26) tilted outwardly from said diaphragm (19), being centered around a center line (15) of the single slit (20) and having parallel incident and exit surfaces.

27. An apparatus in accordance with claim 26, wherein an apex (22) of said biprism (24) points away from said slit (20).

* * * * *